United States Patent [19]
Wickam et al.

[11] 3,825,106
[45] July 23, 1974

[54] AUTOMATIC CRATE FILLER

[75] Inventors: Irwin Edward Wickam, Dodge City; Jerry K. Perkins, Arkansas City, both of Kans.

[73] Assignee: Speed King Manufacturing Company, Inc., Dodge City, Kans.

[22] Filed: Mar. 29, 1972

[21] Appl. No.: 239,101

[52] U.S. Cl. .................. 198/101, 53/64, 198/126
[51] Int. Cl. ............................................. B65g 37/00
[58] Field of Search ............ 198/101, 98, 126, 160, 198/206; 53/64

[56] References Cited
UNITED STATES PATENTS

| | | | |
|---|---|---|---|
| 2,311,084 | 2/1943 | Redder | 198/206 X |
| 3,147,846 | 9/1964 | Huntoon | 53/64 UX |
| 3,283,472 | 11/1966 | Hostetler | 53/64 |

*Primary Examiner*—Richard A. Schacher
*Assistant Examiner*—Douglas D. Watts
*Attorney, Agent, or Firm*—James M. Wetzel

[57] ABSTRACT

An apparatus for depositing a quantity of articles in a container utilizing an endless conveyor mounted on a vertically movable support structure. Belt curtain means attached to the support structure adjacent the article support means of the conveyor aid in confining the articles being transported. When the article level in the container reaches a predetermined height, a limit switch is activated, initiating drive means connected to the belt curtain. Tension applied to the support structure by the belt curtain incrementally and vertically raises the support through a preselected distance or interval, whereby the limit switch is again deactivated and the support structure stops.

6 Claims, 2 Drawing Figures

PATENTED JUL 23 1974 3,825,106

AUTOMATIC CRATE FILLER

The present invention contemplates an apparatus for depositing a quantity of articles in a container, and more particularly relates to an endless conveyor and means for confining articles such as produce or the like on the conveyor's support elements, which confining means is also the medium through which a tension force is applied to vertically raise the conveyor.

In the packaging of large quantities of delicate articles, such as oranges, lemons, or other fruits and vegetables, the articles must be placed in a container without the normal amount of damage occasioned by rough handling. To avoid damage, it was necessary to develop packaging methods wherein the article would not drop into the container, even the distance from the top of the container to the bottom. Since large volumes of articles such as fruit and vegetables must be packaged daily, it is not practical to use hand-packaging methods in modern, large-scale packing installations.

Several devices have been developed in the past in an attempt to solve the above problem, however, none has been entirely satisfactory. Some devices, for example, comprise vertically disposed conveyor loading systems including means for lowering the platform on which the container is mounted as the level of articles in the container rises. While protecting the articles from abrasion and bruising, the constant raising and lowering of the containers introduces additional problems, and limits the weight of articles a container may hold before the raising and lowering mechanism is overtaxed.

Other devices have been developed wherein vertical conveyor means are moved upward in increments as the container fills. Still other devices include curtain means for confining articles on conveyor support elements. By adding such independently operating elements, the margin of error built into such systems increases due the multiplicity of power and driven elements. Such construction is also complex and expensive.

With the foregoing problems in mind, it is a primary object of the present invention to provide a container filling apparatus in which the articles are gently deposited in a container, and a force is applied to raise the apparatus vertically as the height of articles in the container increases.

It is an additional object of the present invention to provide a system for automatically and continuously depositing articles in a container in which the articles are not permitted to drop in free fall through any substantial distance.

A further object of the present invention is to provide a vertically displaceable conveyor system for depositing articles in a container wherein the conveyor system has belt curtain means for confining the articles on conveyor support elements, and means for applying a force to the belt curtain for incrementally raising the conveyor system.

An additional object of the present invention is to provide means for confining articles on support elements in a conveyorized container loading system, whereby a force is applied to the confining means for vertically and incrementally displacing the conveyor system.

Still another object of the present invention is to provide a vertically displaceable conveyorized article depositing apparatus wherein the height of the articles deposited in a container is sensed by the apparatus, causing a force to be applied to incrementally raise the apparatus above the level of articles in the container to allow additional articles to be deposited in the container.

The foregoing and additional objects and advantages of the present invention will be readily apparent from the following detailed description thereof, when considered in conjunction with the appended drawing in which.

Figures 1, 2:
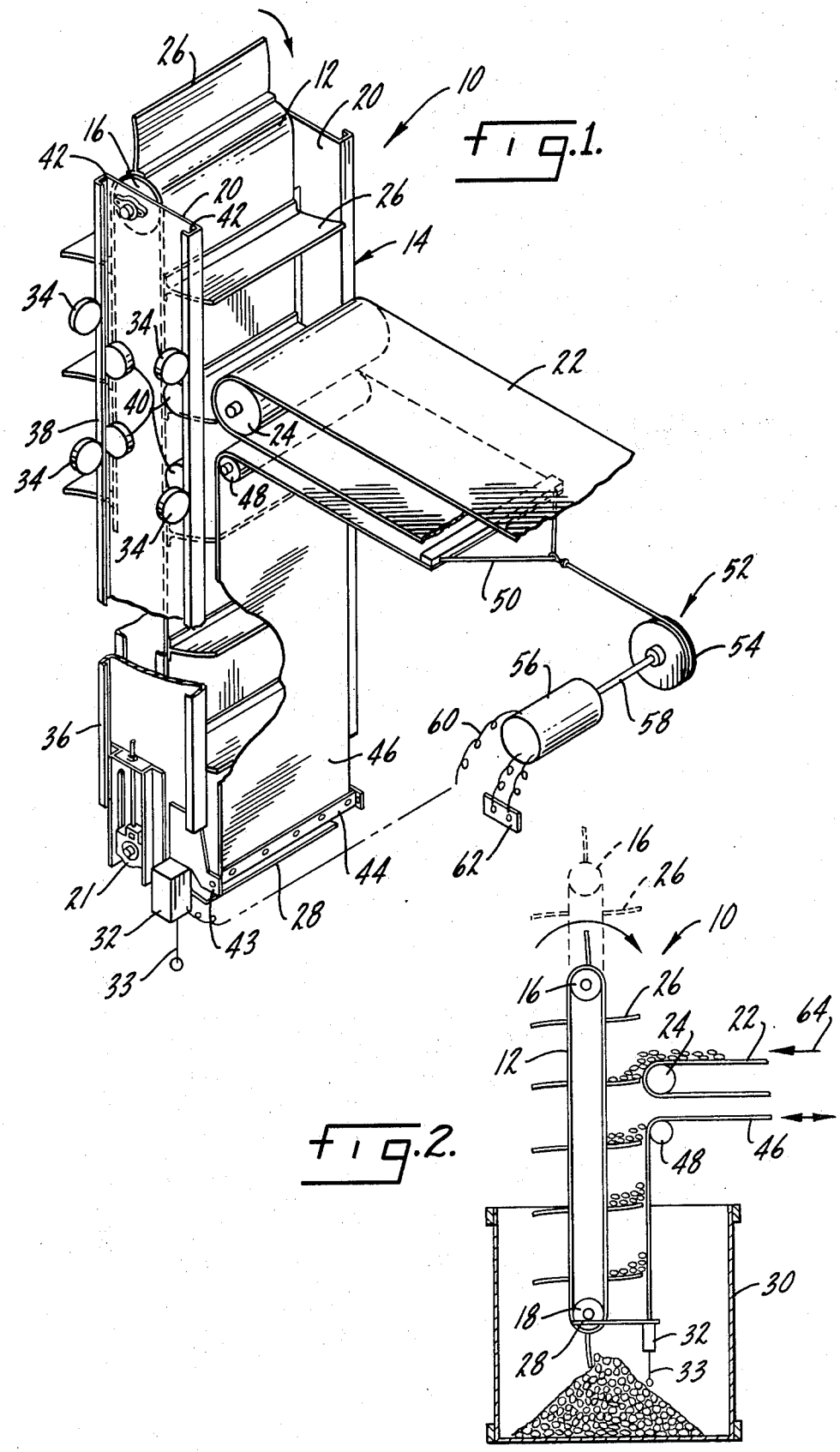
FIG. 1 is a perspective partially cut-away view of the present invention.
FIG. 2 is an elevational schematic view illustrating the operation of the present invention.

An article loading system in accordance with the present invention is generally indicated at 10, FIG. 1. The system includes a conveyor means which comprises an endless conveyor belt 12 mounted for rotation about a support frame 14. Support frame 14 includes upper and lower rollers 16, 18 suitably mounted for rotation between, and at opposite ends of, side panels 20. Conveyor belt 12 extends over and rotates about rollers 16 and 18, and side panels 20 are disposed to extend vertically in the illustrated embodiment. Suitable power means, not shown, are provided to drive one of rollers 16, 18, whereby conveyor belt 12 endlessly passes between panels 20. A belt take up means 21 is provided to maintain conveyor belt 12 taut by eliminating the slack therein.

Horizontal article conveyor means comprising load conveyor 22 are located adjacent the lay of conveyor belt 12 which moves vertically downward during operation of the system 10. Load conveyor 22 is rotatably supported by suitable means such as roller 24, and is disposed to transfer articles lying on the upper lay of load conveyor 22 to a plurality of article supporting cleats 26 on belt 12. As belt 12 rotates in a clockwise direction, as seen in FIG. 1, cleats 26 continuously move downwardly past the end of load conveyor 22, and each cleat receives one or a few articles as they fall off the end of the load conveyor. Panels 20 of frame 14 extend forwardly along the edges of supporting cleats 26 to provide lateral confinement for articles carried by the cleats.

The articles carried by support cleats 26 are transported to the discharge end 28 of loading system 10 where they are gently deposited in a container 30 (FIG. 2). A limit switch 32, including trip lever or wand 33, is fastened to a support panel 20 such that wand 33 extends downwardly beyond discharge end 28 of the loading system. As seen in FIG. 2, wand 33 is adapted to come into contact with an increasing pile of articles deposited in container 30. Upon reaching a predetermined height, the pile of articles causes wand 33 to trip, thereby activating limit switch 32 for purposes to be explained.

Frame 14 of article loading system 10 is mounted for vertical movement in a suitable fixed mounting structure (not shown). Guide rollers 34 are rotatably supported on either side of such mounting structure, and engage tracks 36 formed by flange portions 38 of panels 20. Frame 14 is held against lateral movement by guide rollers 34. Additional guide rollers 40 are secured to the aforementioned support structure for rotation at right angles to the axis of rotation of rollers 34. A pair of rollers 40 are located inside of each channel 42 formed by flange portion 38 of panels 20.

While FIG. 1 illustrates guide rollers 40 on only one side of frame 14, it is to be understood that a like set of guide rollers 40 are similarly supported by the mounting structure on the opposite side of frame 14. Because of their location inside flange 38, guide rollers 40 prevent frame 14 from frontward or backward movement. It is apparent, therefore, that guide rollers 34 and 40 permit frame 14 of loading system 10 to be vertically repositioned, while simultaneously preventing any shifting or movement in a horizontal plane.

Adjacent discharge end 28 of loading system 10, a pair of plate members 43 are attached to frame 14 and support an attachment strip 44 rigidly therebetween. A belt curtain 46 is fixed at one end to attachment strip 44 and extends vertically adjacent the outermost edges of a portion of article supporting cleats 26. The width of belt curtain 46 is sufficient to extend across the face of supporting cleats 26, and along with the forward extension of panels 20, provides complete confinement for articles supported on cleats 26 while they are being transported to discharge end 28 of conveyor system 10.

The upper reach of belt curtain 46 passes over a roller 48 and extends horizontally therefrom beneath load conveyor 22 to a yoke 50 for attaching the opposite end of belt curtain 46 to a drive means 52 which forms part of the lifting means for frame 14, as will be explained. As best illustrated in FIG. 1, the drive means comprises a winch reel 54 driven by output shaft 58 of electric motor 56. Suitable electrical connection means 60 are provided between limit switch 32 and motor 56. Motor 56 is also provided with suitable power means and controls such as hydraulic piston and cylinder devices, electric screw jack mechanisms, or the like may be employed as the drive means for belt curtain 46.

The operation of the automatic article loading system of the present invention will be described with particular reference to the schematic diagram of FIG. 2. A container 30 is placed on suitable support means, such as the floor of a loading installation or on a set of roller tracks or the like, and article loading system 10 is lowered into container 30 such that the discharge end 28 of the system is above the bottom of the container. The distance between discharge end 28 and the bottom of container 30 should be adjusted such that a free falling article deposited from discharge end 28 will not be damaged upon impact with the bottom of the container. Loading system 10 may be manually positioned in container 30 by means of push button control 62 for electric motor 56.

Articles to be loaded into container 30 are carried horizontally on the upper run or lay of load conveyor 22, which is travelling towards conveyor belt 12 in the direction of arrow 64 in FIG. 2. As the articles reach the end of load conveyor 22 adjacent roller 24, they drop onto downwardly moving article supporting cleats 26 which are carried by rotating conveyor belt 12. As stated previously, belt curtain 46 is disposed adjacent the forward edge of cleats 26, and the forward extension of panels 20 of frame 14 in combination with the belt curtain provide means for confining the articles on the cleats and preventing them from falling off.

Upon reaching discharge end 28 of loading system 10, the articles are released from supporting cleats 26 and deposited into container 30. After a while, the deposited articles have formed a pile which reaches upward towards discharge end 28, sometimes making it difficult for additional articles to be freely deposited in container 30. To overcome this difficulty, means are provided for automatically and incrementally raising frame 14. When a predetermined height of articles is reached, wand 33 is triped, activating limit switch 32 and thereby motor 56. Winch reel 54 is rotated by output shaft 58 of motor 56, applying a tension force to belt curtain 46 and raising frame 14 through plates 43.

Due to the position of roller 48, belt curtain 46 retains its position adjacent the forward edge of article supporting cleats 26, and continues to function as a confinement means for the articles being transported by the cleats as frame 14 rises vertically. Therefore, belt curtain 46 serves the dual function of first, providing the means for raising frame 14 when required, and second, retaining articles on conveyor belt 12. The present invention eliminates the need for separate mechanisms to perform these functions. In the preferred embodiment of the invention, motor 56 is provided with a timing control device which shuts off the motor after a predetermined incremental rise of frame 14.

As loading system 10 assumes a higher vertical position, articles are continuously being deposited in container 30 until the height of such articles again trips wand 33 and the above described sequence of operating steps is repeated. Conventional control means, not shown, may also be provided to automatically cease operation of the loading system when discharge end 28 reaches the top of container 30, or when the container is full.

From the foregoing, it will be appreciated that the present invention provides an article loading and conveying system having a belt curtain which not only confines the articles on article supporting cleats, but which also functions to raise the conveyor frame structure in response to the height of articles activating a limit switch. Since the belt curtain extends vertically to a point just below where articles are being deposited on cleats 26 by load conveyor 22, there is hardly any opportunity for the articles to fall from cleats 26 once they start their downward movement.

It will be understood that various modifications and changes may be made in the above-identified apparatus and system which come within the spirit of this invention. It will further be understood that the term "articles" may include fruit or produce of different types capable of being handled in bulk and discretely for packaging, and that the article may be relatively large, as for example grapefruit, or may be relatively small, as for example plums, nuts, or other types of discrete articles which are of non-produce type. All such modifications and changes coming within the scope of the appended claims are embraced thereby.

I claim:

1. Apparatus for depositing a quantity of articles in a container comprising:
    vertically movable vertical conveyor means having a discharge end adapted to extend into a container and discharge an article thereinto:
    said conveyor means having article support means for carrying said articles into said container;
    a flexible movable belt curtain attached at one end to said conveyor means and extending adjacent said article support means for confining said articles on said support means; and lifting means including belt curtain support means for maintaining said belt curtain adjacent to said article support means, said lifting means being attached to said belt curtain and responsive to the level of articles in said container for applying a force to said belt curtain to vertically raise said conveyor means.

2. The apparatus of claim 1 wherein;
said conveyor means includes an endless belt rotating upon conveyor belt support means,
said belt curtain attached to said conveyor belt support means whereby said lifting force is applied to said support means through said belt curtain means.

3. The apparatus of claim 2 wherein said conveyor belt support means includes vertically extending side panel means adjacent said endless conveyor belt and adapted to laterally confine said articles on said article support means.

4. The apparatus of claim 1 including,
additional load conveyor means adapted to sequentially deposit a quantity of articles upon said article support means.

5. The apparatus of claim 1 wherein said lifting means includes:
drive means operably connected to said belt curtain means for applying tension thereto;
limit switch means attached to said conveyor means adjacent said discharge end and adapted to be activated when the level of articles in said container reaches a predetermined height; and
means operably connecting said limit switch and said drive means whereby actuation of said limit switch causes said drive means to apply tension to said belt curtain means for raising said conveyor means.

6. Apparatus for depositing a quantity of articles in a container comprising:
vertically movable conveyor means having a discharge end adapted to extend into a container and discharge an article thereinto;
said conveyor means having article support means for carrying said articles into said container;
additional load conveyor means adapted to sequentially deposit a quantity of articles upon said article support means;
belt curtain means attached at one end to said conveyor means and extending adjacent said article support means for confining said articles on said support means;
said additional load conveyor means being disposed above said belt curtain means and adjacent said conveyor means; and
lifting means attached to said belt curtain and responsive to the level of articles in said container for applying a force to said belt curtain to vertically raise said conveyor means.

* * * * *